United States Patent Office 3,487,102
Patented Dec. 30, 1969

3,487,102
PROCESS FOR PREPARING α,3,3 - TRIMETHYL CYCLOHEXANE METHYL ALKANOATES
Jack H. Blumenthal, Oakhurst, N.J., assignor to International Flavors & Fragrances Inc., New York, N.Y., a corporation of New York
No Drawing. Filed Aug. 22, 1966, Ser. No. 573,882
Int. Cl. C07c 69/06, 31/02
U.S. Cl. 260—497                                      4 Claims

ABSTRACT OF THE DISCLOSURE

Certain novel α,3,3-trimethyl cyclohexane methyl alkanoates, their use as perfume ingredients and the process of making such alkanoates by treating dihydromyrcene with a lower carboxylic acid or water in the presence of an acid catalyst.

---

This invention relates to the synthesis of a new alcohol and derivatives thereof, and a process for producing same.

I have found in accordance with my invention a number of new compounds represented by the formulas

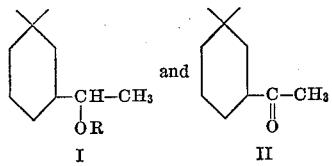

where R is H or an acyl group containing no more than 4 carbon atoms. These compounds are formed in accordance with my invention by treating dihydromyrcene (3,7-dimethyl-1,6-octadiene) with formic acid alone or with a lower carboxylic acid or water in the presence of an acid catalyst, such as sulfuric acid, phosphoric acid, polyphosphoric acid, a Lewis acid, or a sulfonic acid resin. An unexpected rearrangement occurs to yield new compounds, namely esters of α,3,3-trimethyl cyclohexane methanol and the alcohol itself.

Compound II above is formed by oxidation of the alcohol α,3,3-trimethyl cyclohexane methanol.

The alcohol and its esters, as well as the ketone, have pleasant odors which are of value as perfumes.

In carrying out the above process for producing Compound I where water is present, more or less alcohol is formed. The course of the reaction is shown as follows:

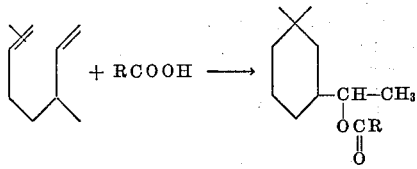

Any water present can either form the alcohol directly or can hydrolyze the ester formed to produce quantities of the corresponding alcohol.

Although the reaction may be performed in aqueous solution, higher conversions are obtained in refluxing formic acid or by the use of the catalysts mentioned above in formic or other carboxylic acids.

The temperature will depend on the activity and amount of the catalyst. With a very active catalyst such as $BF_3$, a temperature of 50° C. gives a good conversion in three hours using formic acid (90%) containing 15% $BF_3$-etherate complex. Without a catalyst a fair conversion to the ester is obtained with refluxing formic acid (100° C.) in about ten hours. The time will vary inversely with the temperature. Therefore, ranges of time and temperature will differ for each catalyst and with the amount of catalyst. In general, a temperature range of 35–100° C. may be specified with a preference of about 50–80° C. and time range of 1–15 hours. At lower than optimum temperatures a mixture of the cyclic ester and the ester of dihydro myrcenol is obtained. For example, at 25° C. with polyphosphoric acid as catalyst in formic acid, the product contained dihydro myrcenyl formate as the major constituent. However, at 75–80° with polyphosphoric acid, the cyclic material was obtained with only a trace of dihydro myrcenyl formate being present. Stannic chloride at 50° C. yielded about a 50/50 mixture of dihydro myrcenyl formate and the cyclic ester in twelve hours.

Neither the amount of catalyst nor the ratio of reactants is critical and may vary over a wide range. When a carboxylic acid other than formic acid is used, a catalyst is required. The carboxylic acids may be either anhydrous or contain varying amounts of water. The alcohol α,3,3-trimethyl cyclohexane methanol was identified from the following data:

The mass spectrum of the new alcohol indicated a molecular weight of 156. The IR (Infrared) spectrum showed the following absorptions:

| Assignment: | Microns |
|---|---|
| OH | 3.0 |
| Gem dimethyl | 7.2, 7.6 |
| Secondary OH | 9.35 |

(Nuclear Magnetic Resonance)

The NMR/spectrum was in accord with the structure given below (I):

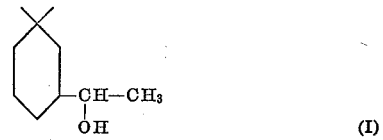

| Δ (p.p.m.) | Assignment | Proton Count |
|---|---|---|
| 3.4 (diffuse quartet) | H—C—OH | 1.1 |
| 2.55 (singlet) | —OH | 1.1 |
| 2.00–1.18 | —CH₂— | 8.8 |
| 1.1 (doublet) | CH₃—CHOH | 3.1 |
| 0.92 | Gem dimethyl | 6.2 |

In order to unequivocally confirm its structure, the alcohol was synthesized by the Grignard reaction of 3,3-dimethylcyclohexyl bromide with acetaldehyde. The alcohol from the Grignard reaction and the product derived from dihydromyrcene were identical by IR and NMR. The mixed melting point of their para-nitrobenzoate esters showed no depression.

Oxidation of the alcohol with chromic acid gave the corresponding ketone. Instrumental analysis confirmed the structure of the ketone as II (below). The mass spectrum of the ketone indicated a molecular weight of 154. The IR spectrum has the following absorptions:

| Assignment: | Microns |
|---|---|
| Carbonyl | 5.84 |
| CH₂CO | 7.40 |
| Gem dimethyl | 7.21, 7.26 |

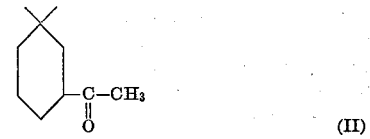

The NMR spectrum was in accord with structure II.

| Δ (p.p.m.) | Assignment | Proton Count |
|---|---|---|
| 0.95 (doublet) | Gem dimethyl | 6.0 |
| 2.05 (singlet) | CH$_3$—C̲=O | 2.9 |
| 2.65–2.18 (multiplet) | H—C̲—C̲=O | 1.1 |
| 1.90–1.00 (multiplet) | —CH$_2$— | 7.8 |

The following are examples of the manner in which I now prefer to practice the invention. It is to be understood that these examples are illustrative and the invention is not to be considered as restricted thereto, except as indicated in the appended claims.

EXAMPLE I

To a stirred mixture of 422 g. of dihydromyrcene (94%) and 307 g. of 90% formic acid was added 44 g. of BF$_3$-etherate over a period of ten minutes. The mixture was stirred at 50° C. for four hours. The heat was then removed and stirring continued for another thirty minutes. An equal volume of water was added and the oil layer separated. The oil layer contained the formate ester. The water layer was extracted with benzene and the combined organic layers washed neutral. After the solvent was stripped off, the residue weighed 490 g. and tested 66.6% as the formate ester. Fractionation yielded α,3,3-trimethyl cyclohexane methyl formate.

B.P. _____ 70° C./3 mm.
D$_{20}$ _____ 0.9439
n$_D^{20}$ _____ 1.4500

Said formate had a woody, minty, rosy odor. It is represented by the formula:

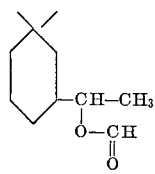

EXAMPLE II

The crude ester (500 g.) prepared as in Example I, was refluxed with a solution of 500 g. of methanol, 200 g. of sodium hydroxide 50%, and 58 g. of water for 1.5 hours. Another 100 g. of water was added to the reaction mixture and the methanol was stripped off to 90° C. at atmospheric pressure. The residue was washed with water, 1% acetic acid and water. The dried residue weighed 355 g. and tested 76% as the alcohol. Fractionation yielded α,3,3-trimethyl cyclohexane methanol.

B.P. _____ 100° C./10 mm.
n$_D^{20}$ _____ 1.4618
D$_{20}$ _____ 0.9071

The product had a sweet, pungent, minty, camphoraceous odor. It is represented by the formula:

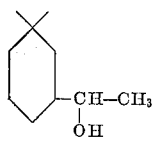

EXAMPLE III

A mixture of 800 g. of dihydromyrcene and 460 g. of formic acid (99%) was refluxed for 6 hours. After cooling, the mixture was separated. The upper layer was rushed-over without washing to yield 670 g. of acid free product testing 53.8% as α,3,3-trimethyl cyclohexane methyl formate.

EXAMPLE IV

To a solution of 400 g. of dihydromyrcene and 300 g. of glacial acetic acid was added 40 g. of BF$_3$-etherate over a period of ten minutes. The solution was stirred at 50° C. for nine hours. After the addition of water, the mixture was separated, the aqueous layer extracted with benzene, the combined organic layers washed neutral and the solvent stripped off. The residue weighed 375 g. and tested 61% as the acetate. Fractionation yielded α,3,3-trimethyl cyclohexane methyl acetate.

B.P. _____ 81° C./4.6 mm.
n$_D^{20}$ _____ 1.4475
D$_{20}$ _____ 0.9315

The product had a sweet, woody, floral odor. It is represented by the formula:

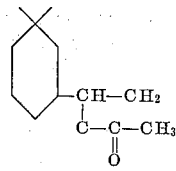

EXAMPLE V

To 520 g. of α,3,3-trimethyl cyclohexane methanol was added a solution of 400 g. of chromic acid, 400 g. of acetic acid and 400 g. of water at 25–30° C. over a period of one hour. The reaction mixture was stirred for another three hours at 30° C. The mixture was then diluted with 600 cc. of water and steam distilled. There was obtained 459 g. of oil testing 96.5% as the ketone by oximation. Fractionation yielded 3,3-dimethyl cyclohexyl methyl ketone.

B.P. _____ 89° C./14 mm.
n$_D^{20}$ _____ 1.4530
D$_{25}^{25}$ _____ 0.8996
M.P. of semicarbazone _____ 191° C.

The product has a strong, minty, herbaceous odor. It is represented by the formula:

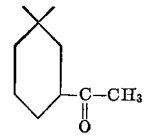

EXAMPLE VI

A mixture of 200 g. of dihydromyrcene, 200 g. of 80% acetic acid and 20 g. concentrated sulfuric acid was refluxed for 5.5 hours. The aqueous layer was separated and 75 cc. of benzene was added to the top layer which was washed twice with water and the solvent stripped off. The residue weighed 185 g. and tested 61% α,3,3-trimethyl cyclohexane methyl acetate.

EXAMPLE VII

A mixture of 200 g. of dihydromyrcene, 115 g. of 90% formic acid and 15 g. of Amberlyst No. 15 sulfonic acid resin (Rohm & Haas) was refluxed for 3 hours. The resin was removed by filtration and the filtrate separated. The filtered resin was washed with benzene. The benzene wash was used to extract the acid layer of the filtrate. The combined top layer of the original filtrate and the benzene extract was washed with water and the solvent stripped off. The residue weighed 196 g. and tested 51.5% as the α,3,3-trimethyl cyclohexane methyl formate.

EXAMPLE VIII

A mixture of 300 g. of dihydromyrcene, 200 g. of isobutyric acid and 20 g. of concentrated sulfuric acid was stirred at 70° C. for 11 hours. After standing overnight, 40 g. of sodium acetate was added and most of the excess isobutyric acid was distilled off at 20 mm. to a pot temperature of 80° C. An equal volume of water was added to the residue and the oil layer separated. The aqueous layer was extracted with benzene and the combined organic layer washed with 5% sodium bicarbonate solution and with water. The washed oil was rushed-over to yield 116 g. of distillate testing 72.5% as the isobutyrate ester. Fractionation yielded α,3,3-trimethyl-cyclohexane methyl isobutyrate.

B.P. _____ 104° C./5.4 mm.
$n_D^{20}$ _____ 1.4448
$D_{20}$ _____ 0.9086

It is represented by the formula:

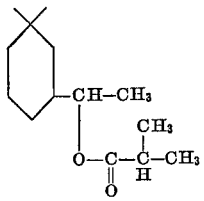

EXAMPLE IX

A mixture of 220 g. of dihydro myrcene, 150 g. of 90% formic acid and 15 g. of concentrated sulfuric acid was stirred at 50–60° C. for four hours. The lower acid layer was separated and the top layer washed neutral with water. The crude ester weighed 257 g. and tested 61% as α,3,3-trimethyl cyclohexane methyl formate.

EXAMPLE X

A mixture of 200 g. of 90% formic acid, 30 g. of 85% phosphoric acid and 160 g. of dihydro myrcene was refluxed for 2.5 hours. After cooling, an equal volume of water was added and the mixture separated. The aqueous layer was extracted with benzene, the combined organic layers washed neutral with water, and the solvent stripped off.

The residue weighed 173 g. and tested 58% as α,3,3-trimethyl cyclohexane methyl formate.

What is claimed is:

1. A process which comprises mixing dihydromyrcene with formic acid in the presence of an acid catalyst selected from the group consisting of sulfuric acid, phosphoric acid, polyphosphoric acid, a Lewis acid, and a sulfonic acid resin to produce α,3,3-trimethyl cyclohexane methyl formate at a temperature of 35–100° C., and recovering said formate.

2. A porcess which comprises mixing dihydro myrcene with formic acid in the presence of a boron trifluoride complex to produce α,3,3-trimethyl cyclohexane methyl formate at a temperature of 35–100° C., and recovering said formate.

3. A process which comprises mixing dihydro myrcene with acetic acid in the presence of a boron trifluoride complex to produce α,3,3-trimethyl cyclohexane methyl acetate at a temperature of 35–100° C., and recovering said acetate.

4. A process which comprises mixing dihydro myrcene with isobutyric acid and sulfuric acid to produce α,3,3-trimethyl cyclohexane methyl isobutyrate at a temperature of 35–100° C., and recovering said isobutyrate.

References Cited

UNITED STATES PATENTS

| | | | |
|---|---|---|---|
| 2,423,545 | 7/1947 | Aeschbach | 260—489 |
| 2,902,510 | 9/1959 | Webb | 260—489 |
| 2,435,403 | 2/1948 | Morris et al. | 260—617 |
| 2,813,894 | 11/1957 | Stoll | 260—587 |

OTHER REFERENCES

Chem. Abstracts, 42:1897c.
Chem. Abstracts, 52:15445d.
Chem. Abstracts, 53:14965a.

LORRAINE A. WEINBERGER, Primary Examiner

V. GARNER, Assistant Examiner

U.S. Cl. X.R.

252—522; 260—471, 488, 489, 587, 631.5